(12) United States Patent
Yamanaka et al.

(10) Patent No.: US 9,874,116 B2
(45) Date of Patent: Jan. 23, 2018

(54) VALVE-TIMING CONTROL DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventors: Atsushi Yamanaka, Atsugi (JP); Isao Doi, Isehara (JP); Seiji Tsuruta, Atsugi (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 0 days.

(21) Appl. No.: 15/117,281

(22) PCT Filed: Mar. 10, 2015

(86) PCT No.: PCT/JP2015/056973
§ 371 (c)(1),
(2) Date: Aug. 8, 2016

(87) PCT Pub. No.: WO2015/137323
PCT Pub. Date: Sep. 17, 2015

(65) Prior Publication Data
US 2016/0348543 A1 Dec. 1, 2016

(30) Foreign Application Priority Data

Mar. 11, 2014 (JP) ................................ 2014-047018

(51) Int. Cl.
*F01L 1/34* (2006.01)
*F01L 1/344* (2006.01)
(Continued)

(52) U.S. Cl.
CPC ............... *F01L 1/344* (2013.01); *F01L 1/047* (2013.01); *F01L 9/04* (2013.01); *F16C 3/06* (2013.01);
(Continued)

(58) Field of Classification Search
CPC . F01L 1/344; F01L 1/352; F01L 1/047; F01L 2820/032; F01L 9/04; F01L 2111/00; F16C 3/06
(Continued)

(56) References Cited

U.S. PATENT DOCUMENTS 5,352,163 A     10/1994 Minegishi et al.
2011/0265747 A1  11/2011 Tadokoro et al.
(Continued)

FOREIGN PATENT DOCUMENTS

JP     05-296300 A    11/1993
JP     2011-231700 A  11/2011
WO     WO-2014/010550 A1  1/2014

*Primary Examiner* — Zelalem Eshete
(74) *Attorney, Agent, or Firm* — Foley & Lardner LLP (57) ABSTRACT

A valve timing control device for an internal combustion engine includes: a driving rotation member, a driven rotation member, a speed reduction mechanism, a circumferential clearance of the each of the rolling member being formed within an angle range of 0.01° to 0.4° in a circumferential direction from a reference line extending from a rotation axis of the driving rotation member in a radial direction, in a space constituted by the eccentric rotation member, the internal teeth constituting section, and the one of the holding holes.

13 Claims, 7 Drawing Sheets

(51) Int. Cl.
    *F01L 1/047*     (2006.01)
    *F01L 9/04*     (2006.01)
    *F16C 3/06*     (2006.01)
    *F01L 1/352*     (2006.01)

(52) U.S. Cl.
    CPC ............ *F01L 1/352* (2013.01); *F01L 2111/00* (2013.01); *F01L 2820/032* (2013.01)

(58) Field of Classification Search
    USPC ..................................................... 123/90.17
    See application file for complete search history.

(56) References Cited

U.S. PATENT DOCUMENTS

| | | | |
|---|---|---|---|
| 2012/0174883 A1* | 7/2012 | Kokubo | F01L 1/352 123/90.15 |
| 2014/0014052 A1 | 1/2014 | Tadokoro et al. | |

* cited by examiner

VALVE-TIMING CONTROL DEVICE FOR INTERNAL COMBUSTION ENGINE

TECHNICAL FIELD

This invention relates to a valve timing control device for an internal combustion engine which is configured to control an opening timing and a closing timing of an intake valve and an exhaust valve.

BACKGROUND ART

There is a below-described patent document 1 which was previously filed by the applicant, as a valve timing control device configured to control to convert a relative rotational phase of a cam shaft with respect to a sprocket by using a rotational force of an electric motor.

This valve timing control device includes an electric motor including a motor housing configured to synchronously rotate with a crank shaft, and a speed reduction mechanism configured to reduce a speed of the rotation of the electric motor, and to transmit this speed-reduced rotation.

This speed reduction mechanism includes an eccentric shaft portion to which the rotational force is transmitted from the motor output shaft; an internal teeth constituting section including an internal teeth which has a waveform shape, and which is formed on an inner circumference; a plurality of rollers each of which are disposed between one of the internal teeth of the internal teeth constituting section and an outer wheel of a ball bearing; a holding device which is provided on a cam shaft's side, which separates the rollers within the plurality of holding holes, and which is arranged to allow a radial movement of the entire rollers.

There are previously prepared a plurality of rollers having different outside diameters. One of the rollers is selectively assembled in accordance with a size of a clearance (radial clearance) which is a backlash gap between the outer circumference surface of the roller and the inner surface of the internal teeth to adjust the backlash. With this, the generation of the hitting noise (tapping noise, hammering noise) by the rollers and the internal teeth during the operation is suppressed.

PRIOR ART DOCUMENT

Patent Document

Japanese Patent Application Publication No. 2011-231700

SUMMARY OF THE INVENTION

However, in the conventional valve timing control device, the rollers having the different outside diameters are selectively assembled, as described above. With this, it is possible to adjust the radial clearance between the outer circumference surfaces of the rollers and the inner surface of the internal teeth. However, a clearance between the outer circumference surface of the rollers and the inside surface of the holding hole of the holding device, that is, a cage clearance in the circumferential direction of the roller is not considered.

Accordingly, when the sizes of the clearances in the circumferential direction are varied, the tapping noise by the impact between the outer circumference surfaces of the rollers and the inside surface of the holding holes is easy to be generated during the driving. Moreover, the operation response at the initial stage of the conversion operation of the speed reduction mechanism may be decreased.

It is, therefore, an object of the present invention to provide a valve timing control device for an internal combustion engine devised to appropriately adjust a cage clearance between an internal teeth and a holding hole in addition to a radial clearance between the rolling member and the internal teeth, to effectively suppress generation of hitting noise, and to suppress a decrease of operation response.

The present invention described in claim 1 of the present invention includes an electric motor whose a rotation state is controlled by a control signal outputted in accordance with an engine driving state; and a speed reduction mechanism configured to reduce a speed of a rotation of the electric motor, and to transmit the speed-reduced rotation to the driven rotation member, the speed reduction mechanism including; an eccentric rotation member provided to the motor output shaft of the electric motor, an internal teeth constituting section which is provided to the driving rotation member, and which has a plurality of internal teeth provided on an inner circumference, a plurality of rolling members which are provided on an outer circumference of the eccentric rotation member, and engaging portions between the rolling members and the internal teeth being moved in the circumferential direction by the eccentric rotation of the eccentric rotation member, and a holding member which is provided to the driven rotation member, and which has holding holes that are configured to restrict a circumferential movement of each of the rolling members, and to allow a radial movement of the each of the rolling members, a backlash in which the each of the rolling member is movable in the circumferential direction being formed within an angle range of 0.01° to 0.4° in a circumferential direction from a reference line extending from a rotation axis of the driving rotation member in a radial direction, in a space constituted by the eccentric rotation member, the internal teeth constituting section, and the one of the holding holes.

By this present invention, it is possible to effectively suppress the generation of the hitting noise between the rolling member and the holding hole during the driving, and to suppress the decrease of the operation response.

DESCRIPTION OF EMBODIMENTS

Hereinafter, a valve timing control device for an internal combustion engine according to embodiments of the present invention are illustrated. Besides, in this embodiment, the valve timing control device is applied to the intake valve side.

Figure 1:
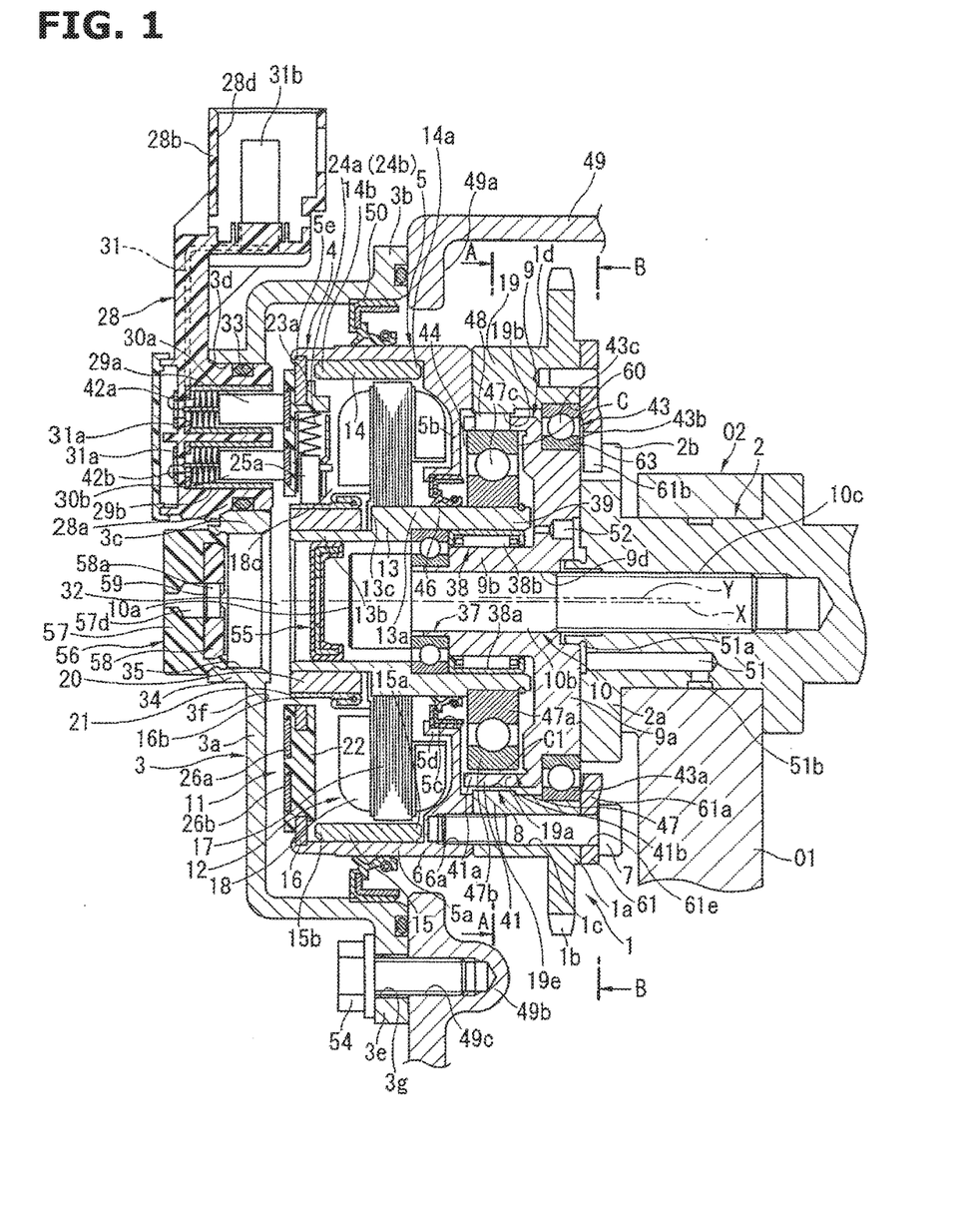
FIG. 1 is a longitudinal sectional view showing a valve timing control device according to a first embodiment of the present invention.
Figure 2:
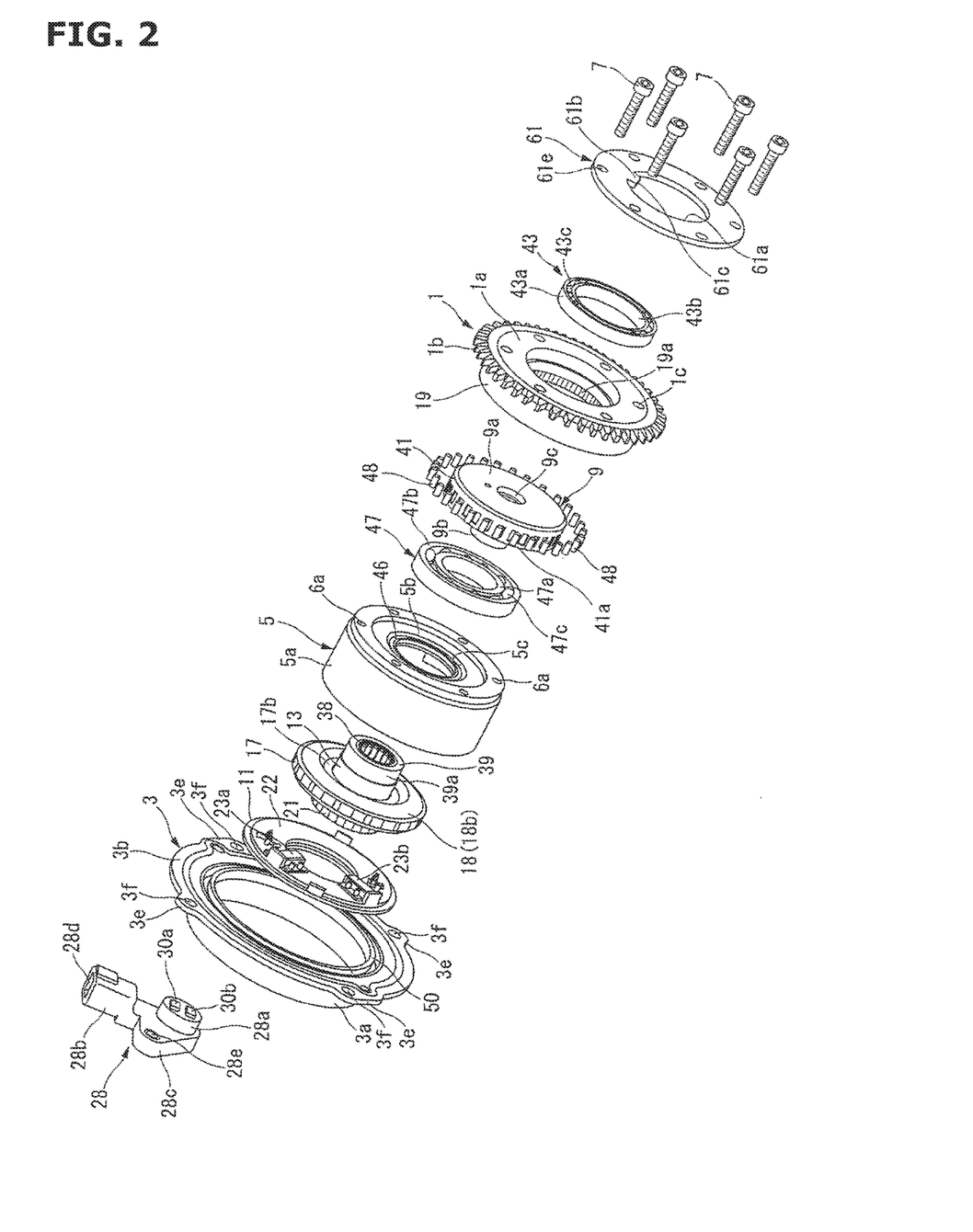
FIG. 2 is an exploded perspective view showing main constituting members in this embodiment.

As shown in FIG. 1 and FIG. 2, this valve timing control device includes a timing sprocket 1 which is a driving rotation member which is drivingly rotated by a crank shaft of the internal combustion engine; a cam shaft 2 which is rotatably supported through a bearing 02 on a cylinder head 01, and which is rotated by a rotational force transmitted from the timing sprocket 1; a cover member 3 fixed to a chain cover 49 disposed at a front position of the timing sprocket 1; and a phase varying mechanism 4 which is disposed between the timing sprocket 1 and the cam shaft 2, and which is arranged to vary a relative rotational phase between the timing sprocket 1 and the cam shaft 2 in accordance with a driving state of the engine.

An entire of the timing sprocket 1 is integrally made from iron series metal into an annular shape. The timing sprocket 1 includes a sprocket main body 1a which includes an inner circumference surface having a stepped shape; a gear portion 1b which is integrally provided on an outer circumference of the sprocket main body 1a, and which is arranged to receive the rotational force from the crank shaft through a wound timing chain (not shown); and an internal teeth constituting section 19 which is integrally provided on the front end side of the sprocket main body 1a.

Moreover, in this timing sprocket 1, a large diameter ball bearing 43 is disposed between the sprocket main body 1a and a driven member 9 (described later) provided at the front end portion of the cam shaft 2. The timing sprocket 1 and the cam shaft 2 are supported by this large diameter ball bearing 43 to be rotated relative to each other.

The large diameter ball bearing 43 includes an outer wheel 43a; an inner wheel 43b; and balls 43c disposed between the outer wheel 43a and the inner wheel 43b. The outer wheel 43a is fixed on an inner circumference side of the sprocket main body 1a. The inner wheel 43b is fixed on the outer circumference side of the driven member 9.

The sprocket main body 1a includes an outer wheel fixing portion 60 which is formed into an annular groove shape by cutting, which is formed on the inner circumference side of the sprocket main body 1a, and which is opened to the cam shaft 2's side.

This outer wheel fixing portion 60 is formed into a stepped shape. The outer wheel 43a of the large diameter ball bearing 43 is press-fit in the outer wheel fixing portion 60 from an axial direction, so as to position an axial one side of this outer wheel 43a.

The internal teeth constituting section 19 is integrally provided on the outer circumference side of the front end portion of the sprocket main body 1a. The internal teeth constituting section 19 is formed into a cylindrical shape extending in a forward direction toward the phase varying mechanism 4. The internal teeth constituting section 19 includes a plurality of internal teeth 19a which have a waveform shape.

Moreover, a female screw forming section 6 is disposed on the front end side of the internal teeth constituting section 19 to confront the front end side of the internal teeth constituting section 19. The female screw forming section 6 has an annular shape. The female screw forming section 6 is integral with a motor housing 5 (described later).

Moreover, there is provided an annular holding plate 61 which is disposed on a rear end portion of the sprocket main body 1a that is opposite to the internal teeth constituting section 19. This holding plate 61 is integrally made from the metal plate. As shown in FIG. 1, the holding plate 61 includes an outside diameter which is substantially identical to an outside diameter of the sprocket main body 1a, and an inside diameter which is smaller than an outside diameter of the outer wheel 43a of the large diameter ball bearing 43.

The holding plate 61 includes an inner circumference portion 61a which is disposed and abutted on an axial outer end surface of the outer wheel 43a of the large diameter ball bearing 43. Moreover, the holding plate 61 includes a stopper raised portion 61b which is integrally provided at a predetermined position of an inner circumference edge of the inner circumference portion 61a, and which protrudes in the radially inside direction, that is, toward the center axis.

Figure 4:
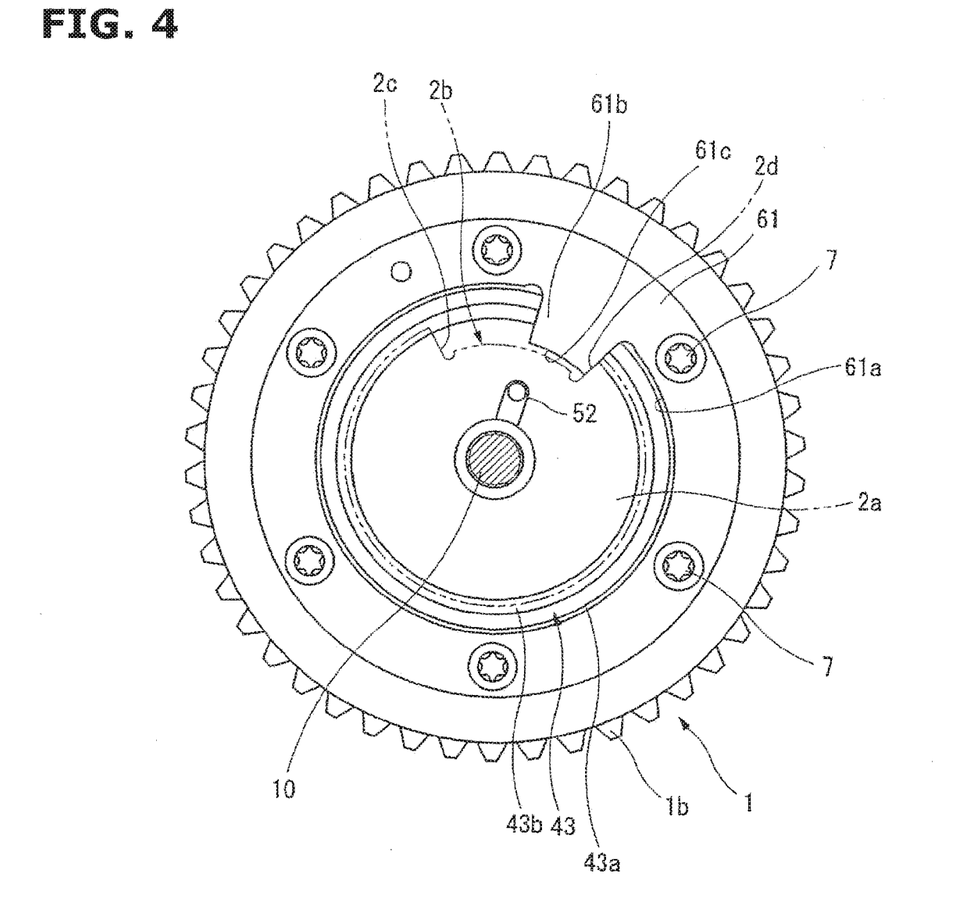
FIG. 4 is a sectional view taken along a section line B-B of FIG. 1.

As shown in FIG. 1 and FIG. 4, this stopper raised portion 61b is formed into a substantially sectorial shape. The stopper raised portion 61b includes a tip end edge 61c which is formed into an arc shape extending along an arc inner circumference surface of a stopper groove 2b (described later). Moreover, the holding plate 61 includes six bolt insertion holes 61d which are formed in an outer circumference portion of the holding plate 61, which are provided at a regular interval in the circumferential direction, which penetrate through the holding plate 61, and each of which a bolt 7 is inserted.

The sprocket main body 1a (the internal teeth constituting section 19) includes six bolt insertion holes 1c which are formed in the outer circumference portion of the sprocket main body 1a at a substantially regular interval in the circumferential direction, and which penetrate through the sprocket main body 1a. The holding plate 61 includes the six bolt insertion holes 61d which are formed in the outer circumference portion of the holding plate 61 at the substantially regular interval in the circumferential direction, and which penetrate through the holding plate 61. Moreover, the female screw forming section 6 includes six female screw holes 6a which are formed at positions corresponding to the bolt insertion holes 1c and 61d. The timing sprocket 1, the holding plate 61, and the motor housing 5 are fixed together from the axial direction by the six bolts inserted into these holes.

Besides, the sprocket main body 1a and the internal teeth constituting section 19 constituting a casing of a speed reduction mechanism 8 (described later).

Moreover, the sprocket main body 1a, the internal teeth constituting section 19, the holding plate 61, and the female screw forming section have a substantially identical outside diameter.

As shown in FIG. 1, the chain cover 49 is disposed and fixed on the front end side of the cylinder block (not shown) and the cylinder head 01 (engine main body) along in the upward and downward directions, so as to cover the chain (not shown) wound around the timing sprocket. The chain cover 49 includes an annular wall 49a which constitutes an opening formed at a position corresponding to the phase varying mechanism 4; boss portions 49b which are integrally formed at four circumferential positions of the annular wall 49a; and female screw holes 49c which are formed from the annular wall 49a to the inside of the boss portions 49b.

As shown in FIG. 1 and FIG. 2, the cover member 3 is integrally formed from the aluminum alloy material into a cup shape. The cover member 3 is disposed to cover the front end portion of the motor housing 5. The cover member 3 includes a cover main body 3a which has a protruding shape; and a mounting flange 3b which has an annular shape, and which is integrally formed on an outer circumference edge of the cover main body 3a on the opening's side. Moreover, a cup-shaped space portion 32 is defined between an inner surface 3*f* of this cover member 3 and an outer surface of the front end portion of the motor housing 5.

The cover main body 3*a* includes a cylindrical wall 3*c* which is located at an outer circumference portion side, and which integrally protrudes in the axial direction. This cylindrical wall 3*c* includes a holding hole 3*d* penetrating through the inside of the cylindrical wall 3*c* in the axial direction.

Moreover, the cover main body 3*a* includes a cylindrical portion 34 which is located on a lower side of the cylindrical wall 3*c* of the cover main body 3*a*, and which extends in parallel to the cylindrical wall 3*c* in the axial direction. This cylindrical portion 34 includes an upper end portion which is integrally connected to the lower end portion of the cylindrical wall 3*c*. The cylindrical portion 34 includes a connection hole 35 which penetrates through the inside of the cylindrical portion 34 in the axial direction, and which is arranged to connect the outside of the cover main body 34*a* and the space portion 32. An air drain (aerification) plug 56 is fixed in the inside of the outer end side of the cylindrical portion 34 by the press-fit.

The connection hole 35 (the cylindrical portion 34) serves as an operation (working) hole for inserting the cam bolt 10 arranged to fix the driven member 9 to the cam shaft 2 through the inside of the motor output shaft 13 after the cover member 3 is assembled to the chain cover 49.

The air drain plug member 56 includes a main body 57 which has a bottomed circular shape; a support portion 58 which has a disc shape, and which is fit and mounted in the recessed groove of the main body 57 by the press-fit; and a filter 59 which has a circular shape, which is disposed and received on the bottom surface of the recessed groove, and which is held to be sandwiched by the bottom surface and the support portion 58.

The main body 57 is integrally formed by the synthetic resin. The main body 57 includes a first air drain (aerification) hole 57*a* penetrating from the center of the bottom surface in the axial direction of the inside. The first air drain hole 57*a* includes an inner end portion which is located on the cover member 3's side in the axial direction, and which has a large diameter; and an air drain hole 57*b* which is located on the outer end side, and which has a small diameter so as to suppress the insertion of the water and the dust (refuse) from the outside into the inside.

The support portion 58 is integrally formed by the synthetic resin which can be elastically deformed. The support portion 58 includes a second air drain (aerification) hole 58*a* which is formed at a central portion, which is connected to the first air drain hole 57*b*, and which penetrates in the axial direction.

The filter 59 is formed into a thin disc cloth shape which can be freely flexibly deformed. The filter 59 has an outside diameter which is smaller than an inside diameter of the bottom surface of the main body. The entire of the filter 59 is adhered on the bottom surface of the recessed groove. Moreover, this filter 59 is formed from material that is arranged to permeate the air from the front surface on the support portion 58's side to the back surface side on the bottom surface side of the main body, and not to permeate the fluid and the dust (refuse) from the back surface to the front surface.

The mounting flange 3*b* includes four boss portions 3*e* which are formed at substantially regular interval positions (about 90 degrees positions) in the circumferential direction. Each of the boss portions 3*e* includes a bolt insertion hole 3*g* through which the bolt 54 screwed into the female screw hole 49*d* formed in the chain cover 49 is inserted, and which penetrates through the boss portion 3*e*. The cover member 3 is fixed to the chain cover 49 by the bolts 54.

An oil seal 50 having a large diameter is disposed between the inner circumference surface of the stepped portion of the cover main body 3*a* on the radially outside and the outer circumference surface of the motor housing 5. This large diameter oil seal 50 has a substantially U-shaped transverse section. In this oil seal 50, a core metal is embedded inside the base material of the synthetic rubber. An annular base portion of the oil seal 50 on the radially outside is mounted and fixed on a stepped annular portion 3*h* provided on the inner circumference surface of the cover member 3. This large diameter oil seal 50 liquid-tightly seals the space portion 32. The large diameter oil seal 50 is arranged to mainly prevent the insertion of the lubrication oil dispersed in accordance with the driving rotation of the timing sprocket 1, into the space portion 32.

As shown in FIG. 1, the motor housing 5 includes the housing main body 5*a* which is formed into a bottomed cylindrical shape by press-forming the iron series metal material; and a power feeding plate 11 which closes a front end opening of the housing main body 5*a*.

The housing main body 5*a* includes a separation wall 5*b* which has a circular plate shape, and which is disposed on a rear end side of the housing main body 5*a*; a shaft insertion hole 5*c* which has a large diameter, which is formed at a substantially central portion of the separation wall 5*b*, and through which an eccentric shaft portion 39 (described later) is inserted; and an elongating portion 5*d* which has a cylindrical shape, which is integrally provided on an edge of the shaft insertion hole 5*c*, and which protrudes in the axial direction of the cam shaft 2. Moreover, the female screw forming section 6 is integrally formed on the outer circumference side of the front end surface of the separation wall 5*b*.

The cam shaft 2 includes two drive cams which are provided to one of the cylinders, and which are provided on an outer circumference of the cam shaft 2, and each of which is arranged to open the intake valve (not shown); and the flange portion 2*a* integrally provided at the front end portion of the cam shaft 2.

As shown in FIG. 1, this flange portion 2*a* has an outside diameter which is slightly larger than an outside diameter of a fixing end portion 9*a* of the driven member 9 (described later), so that the outer circumference portion of the front end surface of the flange portion 2*a* is disposed and abutted on the axial outer end surface of the inner wheel 43*b* of the large diameter ball bearing 43 after the constituting components are assembled. Moreover, the flange portion 2*a* (the cam shaft 2) is connected to the driven member 9 by a cam bolt 10 in a state where the front end surface of the flange portion 2*a* is abutted on the driven member 9 in the axial direction.

Furthermore, as shown in FIG. 4, the flange portion 2*a* includes the stopper recessed groove 2*b* which is formed on the outer circumference of the flange portion 2*a* along the circumferential direction, and into which the stopper raised portion 61*b* of the holding plate 61 is engageably inserted. This stopper recessed groove 2*b* is formed into an arc shape having a predetermined circumferential length. The stopper raised portion 61*b* is arranged to be pivoted in a range of this circumferential length of the stopper recessed groove 2*b*. Both end circumferential edges of the stopper raised portion 61*b* are arranged to be abutted, respectively, on confronting circumferential edges 2*c* and 2*d* of the stopper recessed groove 2*b*, so as to restrict the relative rotational position of the cam shaft 2 on the maximum advance angle side or the maximum retard angle side with respect to the timing sprocket 1.

The stopper raised portion 61b is disposed at a position which is apart toward the cam shaft 2's side, relative to a portion of the holding plate 61 that is fixed to confront the outer wheel 43a of the large diameter ball bearing 43 from the axially outward direction. The stopper raised portion 61b is not contacted on the fixing end portion 9a of the driven member 9 in the axial direction. Accordingly, it is possible to sufficiently suppress the interference between the stopper raised portion 61b and the fixing end portion 9a.

As shown in FIG. 1, the cam bolt 10 includes a head portion 10a having an end surface which supports an inner wheel of a small ball bearing 37 from the axial direction; and a shaft portion 10b having an outer circumference which includes an external screw 10c that is screwed in the internal screw formed inside the cam shaft 2 from the end portion of the cam shaft 2 in the axial direction.

The driven member 9 is integrally made from the iron series metal. As shown in FIG. 1, the driven member 9 includes the fixing end portion 9a which has a circular plate shape, and which is formed on a rear end side (the cam shaft 2's side); a cylindrical portion 9b which protrudes from the front end surface of the inner circumference of the fixing end portion 9a in the axial direction; and a holding (retaining) device 41 which is a holding member, which has a cylindrical shape, which is integrally formed on the outer circumference portion of the fixing end portion 9a, and which holds a plurality of rollers 48 which are rolling members.

The fixing end portion 9a includes a rear end surface which is disposed and abutted on the front end surface of the flange portion 2a of the cam shaft 2. The fixing end portion 9a is fixed to the flange portion 2a by the pressure welding by the axial force of the cam bolt 10 in the axial direction.

As shown in FIG. 1, the cylindrical portion 9b includes an insertion hole 9d which is formed at a substantially central portion of the cylindrical portion 9b, which penetrates through the cylindrical portion 9b, and through which the shaft portion 10b of the cam bolt 10 is inserted. A needle bearing 38 which is a bearing member is provided on the outer circumference side of the cylindrical portion 9b.

As shown in FIG. 1, the holding device 41 has a section having a substantially L-shape by bending from the front end of the outer circumference portion of the fixing end portion 9a in the forward direction. The holding device 41 has a bottomed cylindrical shape protruding in a direction identical to that of the cylindrical portion 9b.

The cylindrical tip end portion 41a of the holding device 41 extends toward the separation wall 5b of the motor housing 5 through a receiving space 44 which has an annular recessed shape, and which is formed between the female screw forming section 6 and the elongating portion 5d. Moreover, as shown in FIG. 1 and FIG. 2, the cylindrical tip end portion 41a of the holding device 41 includes a plurality of roller holding holes 41b each of which is cut out into a substantially rectangular shape, which are formed at a regular interval in the circumferential direction, and each of which is arranged to hold one of the plurality of the rollers 48 so that the rollers 48 are rolled. A number of the roller holding holes 41b (the rollers 48) is smaller than a number of the teeth of the internal teeth 19a of the internal teeth constituting section 19. With this, it is possible to obtain a speed reduction ratio.

The phase varying mechanism 4 includes the electric motor 12 disposed on the front end side of the cylindrical portion 9b of the driven member 9; and a speed reduction mechanism 8 arranged to reduce a rotation speed of the electric motor 12, and to transmit the reduced rotation speed to the cam shaft 2.

As shown in FIG. 1 and FIG. 2, the electric motor 12 is a DC motor with a brush. The electric motor 12 includes the motor housing 5 which is a yoke arranged to rotate as a unit with the timing sprocket 1; a motor output shaft 13 which is rotatably received within the motor housing 5; a pair of permanent magnets 14 and 15 each of which has a semi-arc shape, and which is a stator fixed on an inner circumference surface of the motor housing 5; and the power feeding plate 11.

The motor output shaft 13 serves as an armature. The motor output shaft 13 is formed into a stepped cylindrical shape. The motor output shaft 13 includes a stepped portion 13c which is formed at a substantially central portion of the motor output shaft 13 in the axial direction; a large diameter portion 13a which is positioned on the cam shaft 2's side of the stepped portion; and a small diameter portion 13b on a side of the stepped portion which is opposite to the large diameter portion 13a. An iron core rotor 17 is fixed on an outer circumference of the large diameter portion 13a. The eccentric shaft portion 39 constituting a part of the speed reduction mechanism 8 is integrally formed at the rear end portion of the large diameter portion 13a.

On the other hand, an annular member 20 is fixed on an outer circumference of the small diameter portion 13b by the press-fit. A commutator 21 described later is fixed on an outer circumference surface of the annular member 20 by the press-fit from the axial direction, and positioned in the axial direction by the outer surface of the stepped portion 13c. The annular member 20 has an outside diameter which is substantially identical to the outside diameter of the large diameter portion 13a. The annular member 20 has an axial length which is slightly smaller than that of the small diameter portion 13b.

A plug member 55 is fixed on the inner circumference surface of the small diameter portion 13b by the press-fit. The plug member 55 is configured to suppress the leakage of the lubricating oil which is supplied to the motor output shaft 13 and the eccentric shaft portion 39 to lubricate the bearings 37 and 38, to the outside.

The iron core rotor 17 is made from a magnetic material having a plurality of magnetic poles. The iron core rotor 17 includes an outer circumference portion which is a bobbin that has slots on which wire of coil 18 is wound.

On the other hand, the commutator 21 is made from conductive material into an annular shape. The commutator 21 includes segments which are obtained by dividing the commutator 21 by the number which is identical to the number of the poles of the iron core rotor 17, and to which terminals of the pulled-out wire of the coil 18 are electrically connected.

Each of the permanent magnets 14 and 15 has an overall cylindrical shape. Each of the permanent magnets 14 and 15 has the plurality of the magnetic poles in the circumferential direction. The permanent magnets 14 and 15 are positioned at axial positions which are offset from the axial center (the center in the axial direction) of the iron core rotor 17 on the power feeding plate 11's side. With this, the front end portions of the permanent magnets 14 and 15 are disposed to be overlapped, in the radial direction, with switching brushes 25a and 25b (described later) which are provided to the commutator 21 and the power feeding plate 11.

Figure 5:
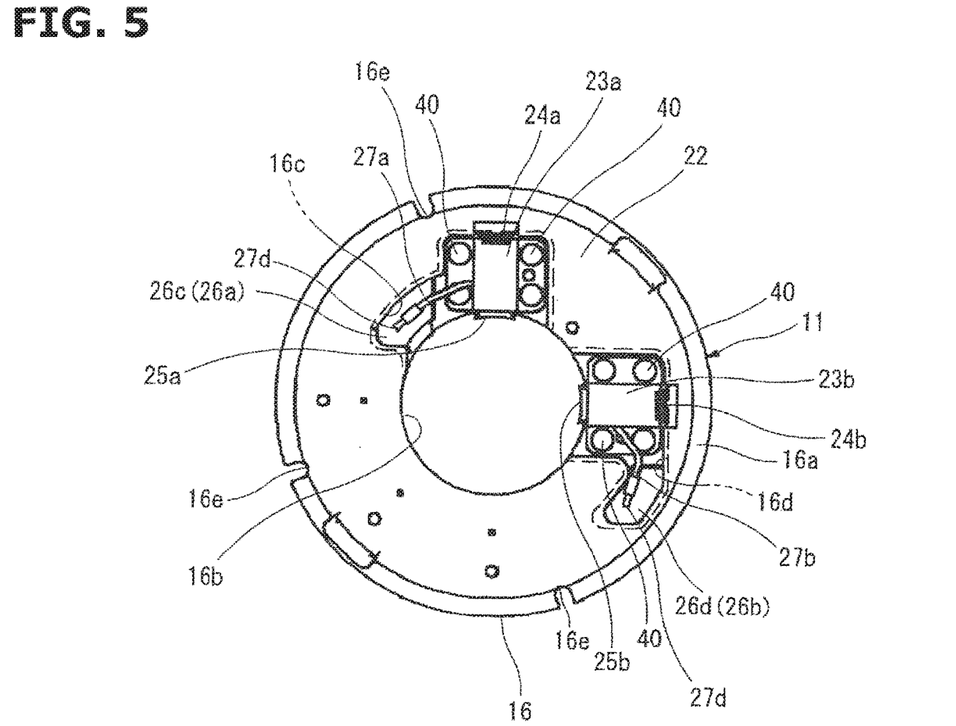
FIG. 5 is a back view showing a power feeding plate in this embodiment.

As shown in FIG. 1 and FIG. 5, the power feeding plate 11 includes a rigid plate portion 16 (fixing plate) which is made from metal series material, and which has a substantially disc shape; and a resin portion 22 which has a circular plate shape, and which is molded on front and rear side surfaces of the rigid plate portion 16. Besides, this power feeding plate 11 constitutes a part of the power feeding mechanism to the electric motor 12.

The rigid plate 16 includes an outer circumference portion 16a which is not covered with the resin portion 22 to be exposed, and which is poisoned and fixed in an annular stepped recessed portion 5e that is formed on the inner circumference of the front end portion of the motor housing 5 by caulking. Moreover, the rigid plate 16 includes a shaft insertion hole 16b which is formed at a central portion of the rigid plate 16, into which one end portion of the motor output shaft 13 and so on is inserted, and which penetrates through the rigid plate 16. Moreover, as shown in FIG. 5, the rigid plate 16 includes two holding holes 16c and 16d which have the variant shapes, and which are formed on an inner circumference edge of the shaft insertion hole 16b at predetermined continuous positions by the punching. Brush holders 23a and 23b described later are mounted and held in the holding holes 16c and 16d.

Besides, the rigidity plate 16 includes three U-shaped grooves 16e which are formed on the outer circumference portion 16a at predetermined circumferential positions, and which are arranged to position the rigidity plate 16 in the circumferential direction with respect to the housing main body 5a through a jig (not shown).

Moreover, as shown in FIG. 1 and FIG. 5, the power feeding plate 11 is provided with a pair of the brush holders 23a and 23b which are made from a copper, which are disposed, respectively, within the holding holes 16c and 16d of the rigid plate 16, and which are fixed to the resin portion 22 by a plurality of rivets 40; a pair of switching brushes 25a and 25b which are received within the brush holders 23a and 23b, which are arranged to be slid in the radial directions, each of which includes an arc tip end surface that is elastically abutted on the outer circumference surface of the commutator 21 from the radial direction by spring forces of coil springs 24a and 24b, and which are commutators; inner and outer power feeding slip rings 26a and 26b which are molded and fixed on the front end portion of the resin portion 22 in a state where the respective front end surfaces of the inner and outer power feeding slip rings 26a and 26b are exposed; and a pair of pig-tail harnesses 27a and 27b which are conducting wires electrically connecting the switching brushes 25a and 25b and the slip rings 26a and 26b. These constituting components and the power feeding plate 11 constitute the power feeding mechanism.

Figure 7:
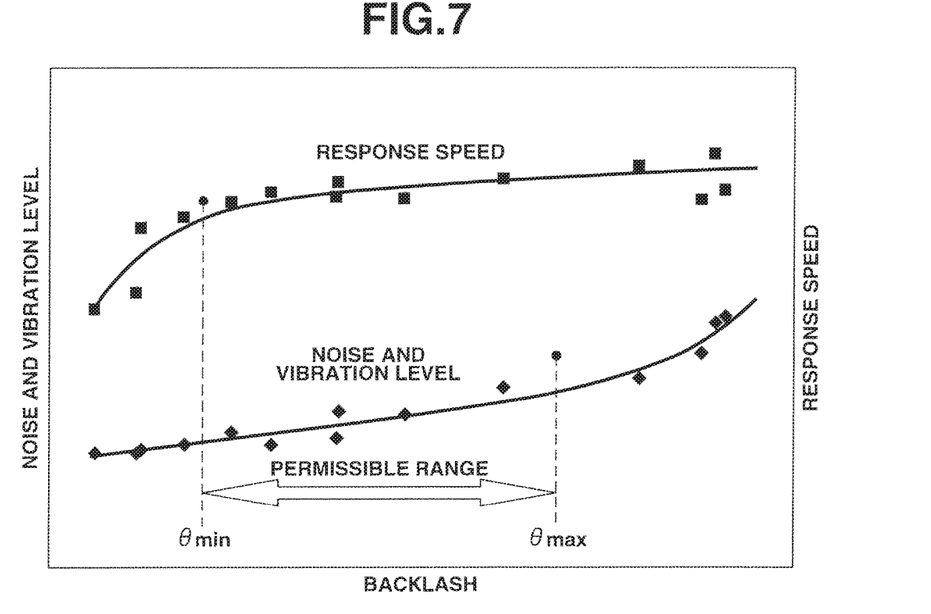
FIG. 7 is a characteristic view showing a range from a maximum angle to a minimum angle of a backlash by employing a noise level and a response speed as parameters.

The small diameter slip ring 26a which is located on the inner circumference side, and the large diameter slip ring 26b which is located on the outer circumference side are formed into circular shapes by punching thin plates made from copper material by the press. As shown in FIG. 5 and FIG. 7, in the slip ring 26a and the slip ring 26b, portions 26c and 26d of the rear end surface which confront the inside of the motor housing 5 are exposed from the resin portion 22.

A holding member 28 is fixed to the cover main body 3a of the cover member 3. The holding member 28 is integrally molded by the synthetic resin. As shown in FIG. 1 and FIG. 2, this holding member 28 is formed into a substantially L-shape when viewed from a side. The holding member 28 mainly includes a brush holding portion 28a which has a bottomed cylindrical shape, and which is inserted into the holding hole 3d of the cover member 3; a connector portion 28b located on a side opposite to the brush holding portion 28a; a boss portion 28 which is integrally provided to on one end surface of the brush holding portion 28a to protrude, and which is fixed to the cover body member 3a by bolts; and power feeding terminal strips 31 and 31 whose a portion is embedded in the internal portion.

As shown in FIG. 1 and FIG. 2, the brush holding portion 28a includes a pair of rectangular hollow holes which extend in a substantially horizontal direction (the axial direction), and which are formed in parallel with each other at upper and lower portions of the inside space (the radially inside and the radially outside of the axial center of the motor housing 5). Brush holders 29a and 29b are fixed, respectively in these rectangular hollow holes of the brush holding portion 28a by the press-fit. Power feeding brushes 30a and 30b are held within these brush holder 29a and 29b to be slid in the axial direction.

Moreover, in this brush holding portion 28a, the annular seal member 33 is mounted and held in the circular mounting groove formed in the outer circumference on the base end side, as shown in FIG. 1. The annular seal member 33 is elastically abutted on the inner circumference surface of the holding hole 3d. The annular seal member 33 liquid-tightly seals a portion between the space portion 32 and the outside of the cover member 3.

Each of the brush holders 29a and 29b includes opening portions formed on front and rear ends. Tip end portions of the power feeding brushes 30a and 30b are arranged to be moved from and into the opening portions of the front end side. The one end portions of the pig tail harnesses (not shown) are connected through the opening portions of the rear end side to the rear ends of the power feeding brushes 30a and 30b by the soldering.

Each of the power feeding brushes 30a and 30b is formed into the rectangular shape. Each of the power feeding brushes 30a and 30b has a predetermined axial length. The power feeding brushes 30a and 30b include flat tip end surfaces which are arranged to be abutted on the slip rings 26a and 26b from the axial direction.

A pair of coil springs 42a and 42b are provided on the rear end sides of the insides of the brush holders 29a and 29b of the brush holding portion 29. The pair of the coil springs 42a and 42b are arranged to urge the power feeding brushes 30a and 30b toward the slip rings 26a and 26b.

As shown in FIG. 1, the pair of the power feeding terminal strips 31a and 31b extend in parallel with each other in the upward and downward directions. Each of the power feeding end terminal strips 31a and 31b has a substantially crank shape. Terminals 31a and 31a on one side (lower end side) are disposed in an exposed state. Terminals 31b and 31b on the other side (the upper end side) are provided within female type mounting grooves 28d of the connector portion 28b to protrude.

The terminals 31a and 31a of the one side are disposed to be abutted on the upper surfaces of the bottom wall 28f. The other end portions of the pair of the pig tail harnesses (not shown) are connected to the terminals of the one side by the soldering.

As described above, each of the pig tail harnesses has a length set so that the power feeding brushes 30a and 30b are not dropped from the brush holders 29a and 29b even when the power feeding brushes 30a and 30b are pushed by the spring forces of the coil springs 42a and 42b.

In the connector portion 28b, the other end side terminals 31b and 31b confronting the above-described mounting groove 28d having the upper end portion into which the male type terminal (not shown) is inserted is connected through the male type terminal to the control unit (not shown).

The motor output shaft 13 and the eccentric shaft portion 39 are rotatably supported by the small diameter ball bearing 37 and the needle bearing 38. The small diameter ball bearing 37 is provided on the outer circumference surface of the shaft portion 10b of the cam bolt 10. The needle bearing 38 is disposed on the outer circumference surface of the cylindrical portion 9b of the driven member 9, and disposed on the axial side portion of the small diameter ball bearing 37.

The needle bearing 38 includes a cylindrical retainer 38a which is press-fit in the inner circumference surface of the eccentric shaft portion 39; and needle rollers 38b which are a plurality of rolling members that are rotatably held within the retainer 38a. These needle rollers 38b are rolled on the outer circumference surface of the cylindrical portion 9b of the driven member 9.

The small diameter ball bearing 37 includes an inner wheel which is sandwiched and fixed between the front end edge of the cylindrical portion 9b of the driven member 9 and the head portion 10a of the cam bolt 10; and an outer wheel which is fixed in the inner circumference surface of the eccentric shaft portion 39 which has the diameter-increased stepped shape by the press-fit, and which is abutted on the stepped edge formed on the inner circumference surface to be positioned in the axial direction.

A small diameter oil seal 46 is provided between the outer circumference surface of the motor output shaft 13 (the eccentric shaft portion 39) and the inner circumference surface of the extension portion 5d of the motor housing 5. The small diameter oil seal 46 is arranged to prevent the leakage of the lubricant from the inside of the speed reduction mechanism 8 to the inside of the electric motor 12. This oil seal 46 separates the electric motor 12 and the speed reduction mechanism 8 by the sealing function.

The control unit is arranged to sense a current driving state of the engine based on information signals from various sensors such as a crank angle sensor (not shown), an air flow meter (not shown), a water temperature sensor, and an accelerator opening degree sensor, and to perform the engine control based on these information signals. Moreover, the control unit is configured to perform rotation control of the motor output shaft 13 by energizing the coil 18 through the power feeding brushes 30a and 30b, the slip rings 26a and 26b, the switching brushes 25a and 25b, the commutator 21 and so on, and to control a relative rotational phase of the cam shaft 2 with respect to the timing sprocket 1 by the speed reduction mechanism 8.

Figure 3:
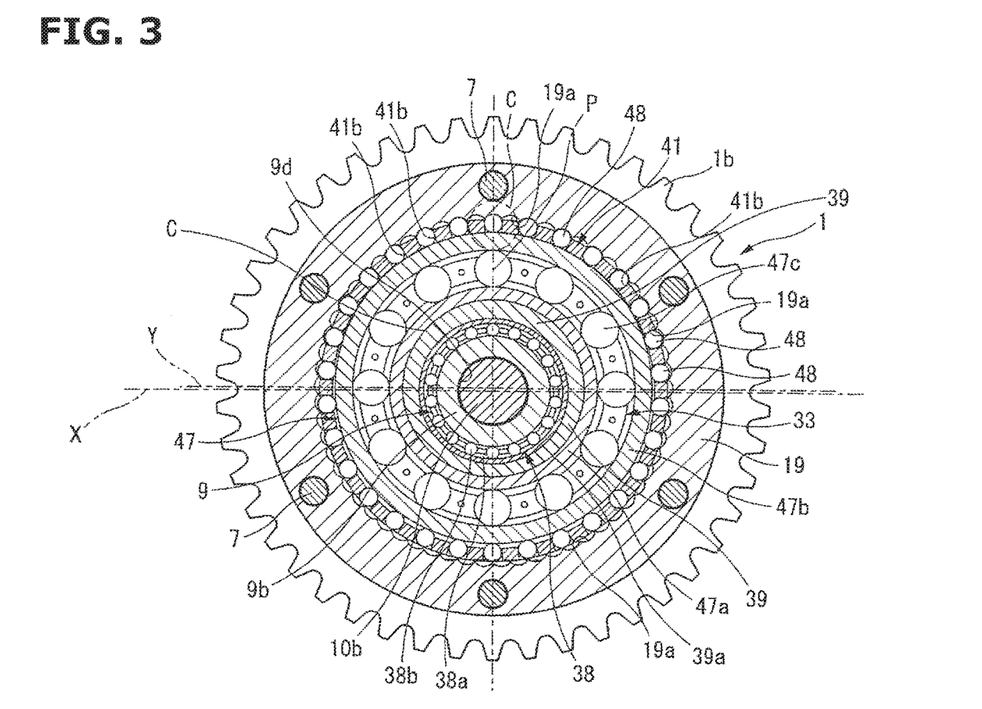
FIG. 3 is a sectional view taken along a section line A-A of FIG. 1.

As shown in FIG. 1 to FIG. 3, the speed reduction mechanism 8 includes the eccentric shaft portion 39 arranged to perform the eccentric rotation movement (to rotate in an eccentric state); a middle diameter ball bearing 47 which is provided on the outer circumference surface of the eccentric shaft portion 39; the rollers 48 which are provided on the outer circumference of the middle diameter ball bearing 47; the holding device 41 which is arranged to allow the movement of the rollers 48 in the radial direction while holding the rollers 48 in the rolling direction; and the driven member 9 which is integral with the holding device 41. Besides, the eccentric shaft portion 39 and the middle diameter ball bearing 47 constitute an eccentric rotation member (section).

The eccentric shaft portion 39 includes a cam surface 39a formed on the outer circumference surface of the eccentric shaft portion 39. The cam surface 39a of the eccentric shaft portion 39 has a rotation center Y which is slightly eccentric from a rotation axis X of the motor output shaft 13 in the radial direction.

The entire of the middle diameter ball bearing 47 is disposed to be substantially overlapped with the needle bearing 38 in the radial direction. The middle diameter ball bearing 47 includes an inner wheel 47a; an outer wheel 47b; and balls 47c disposed between the inner and outer wheels 47a and 47b. The inner wheel 47a is fixed on the outer circumference surface of the eccentric shaft portion 39 by the press-fit. The outer wheel 47b is not fixed in the axial direction so as to be a free state. That is, this outer wheel 47b includes a first end surface which is on the electric motor 8's side, and which is not abutted on any portions; and a second axial end surface which is disposed with a minute first clearance C between the second axial end surface and the inner side surface of the holding device 41 which confronts the second axial end surface. With this, the outer wheel 47b is in the free state. Moreover, the outer circumference surfaces of the rollers 48 are abutted on the outer circumference surface of the outer wheel 47b to be rolled on the outer circumference surface of the outer wheel 47b. An annular second clearance C1 is formed on the outer circumference side of the outer wheel 47b. The entire of the middle diameter ball bearing 47 is arranged to be moved in the radial direction by this second clearance C1 in accordance with the eccentric rotation of the eccentric shaft portion 39, that is, to perform the eccentric movement.

The rollers 48 are made from the iron series metal into a solid cylindrical shape. The rollers 48 have a uniform outside diameter. The rollers 48 are arranged to be moved in the radial directions in accordance with the eccentric movement of the middle diameter ball bearing 47, and thereby to be inserted and mounted in the internal teeth 19a of the internal teeth constituting section 19. The rollers 48 are arranged to be pivoted in the radial direction while being guided in the circumferential direction by the both side edges of the roller holding holes 41b of the holding device 41.

Figure 6:
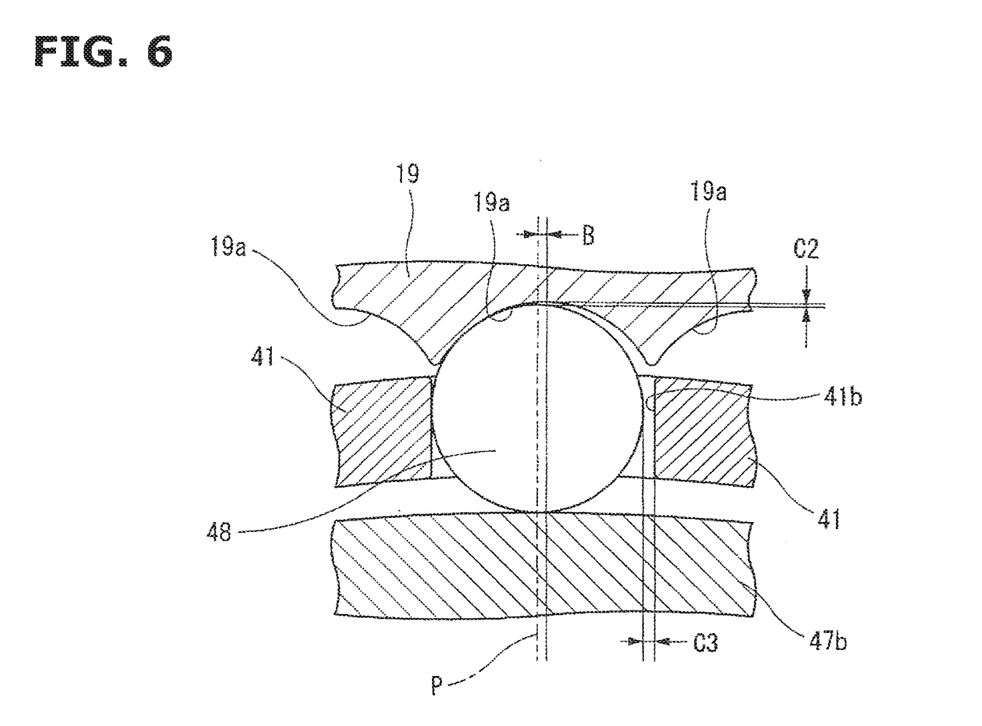
FIG. 6 is an enlarged view showing a C portion in FIG. 3.

Moreover, when each of the rollers 48 is set between one of the internal teeth 19a of the internal teeth constituting section 19 and the outer wheel 47b of the middle diameter ball bearing 47 in a state where the each of the rollers 48 is received in the roller holding hole 41b of the holding device 41, a minute radial clearance C2 (backlash) is formed between the outer surface of the roller 48 and the inner surface of the internal teeth 19a, as shown in FIG. 6. Moreover, a minute cage clearance C3 (backlash) is formed between the outer surface 48a of the roller 48 and one of the inner side surfaces 41c of the roller holding hole 41b which confronts each other. These clearances C2 and C3 are needed for ensuring the operation response at the initial stage of the rolling of the rollers 48 at the conversion operation of the speed reduction mechanism 8, as described later.

The clearance (backlash B) to enable the roller 48 to be moved in the circumferential direction within the roller holding hole 41b is formed in an angle range of 0.01° to 0.4° from a center line P which is a reference line, and which extends in perpendicular (extending in the radial direction) from the rotation center of the timing sprocket 1, that is, the rotation axis X of the motor output shaft 13, as shown in FIG. 6. The backlash B to enable the roller 48 to be moved in the circumferential direction within this roller holding hole 41b is determined by the relative size of the radial clearance C2 and the cage clearance C3.

That is, the cage clearance C3 between the one of the inner side surfaces 41c of the roller holding hole 41b and the outer surface 48a of the one roller 48 is set in a range from 0.03 to 0.110 mm.

The radial clearance C2 between the outer surface of the roller 48 and the inner surface of the internal teeth 19a is set in a range from 0.003 to 0.06 mm.

This radial clearance C2 and the cage clearance C3 can be adjusted by varying the outside diameter of the outer wheel 47b of the middle diameter ball bearing 47, and by varying the inside diameter of the inner surface of the internal teeth 19a.

That is, for example, a plurality of the ball bearings 47 are previously prepared. When the constituting components such as the middle diameter ball bearing 47 are assembled, the components are selected so that the clearances C2 and C3 have the range defined in claims so as to set the appropriate clearances.

Alternatively, there are prepared a plurality of internal teeth constituting section 19 (timing sprocket 1) which have arc inner surfaces of the internal teeth 19a having different inside diameters. When the constituting components are assembled, the components are selected so that the clearances C2 and C3 have the range defined in claims so as to set the appropriate clearances.

In this embodiment, the clearance is adjusted by preparing the plurality of the ball bearings 47 having the outer wheels 47b having the different outside diameters, in the former case.

The present inventor deduced that the angle within which the roller 48 can be moved within the roller holding hole 41b in the circumferential direction is set to the angle range of 0.01° to 0.4° from the reference line P extending perpendicular from the rotation axis X of the (roller) motor shaft 13, by the many experimental data. Hereinafter, this reason is explained.

That is, in case where the angle θ of the backlash B is determined in the experiment, a relative characteristic between the noise level N (broken line) at the driving of the device and the response speed V (the solid line) at the initial stage of the phase conversion is employed as the parameters as shown in FIG. 7. A point V1 at which the response speed V becomes a predetermined permissible speed is previously determined. A minimum angle θmin which satisfies this is set. On the other hand, a point N1 at which the noise level N becomes a predetermined permissible level is previously determined. A maximum angle θmax which satisfies this is set.

Accordingly, it was understood that the desired response speed V and the desired noise level N can be obtained when the circumferential movement of the roller 48 within the roller holding hole 41b is in the angle range from the minimum λmin to the maximum angle λmax. It was understood by the experiment that this angle range was the angle range from 0.01° to 0.4° in the circumferential direction from the reference line of the rotation axis P extending perpendicular to the rotation axis X of the motor output shaft 13.

The angle range from 0.01° to 0.4° is set by setting the relative clearance between the radial clearance C2 and the cage clearance C3, as described above.

Figure 8:
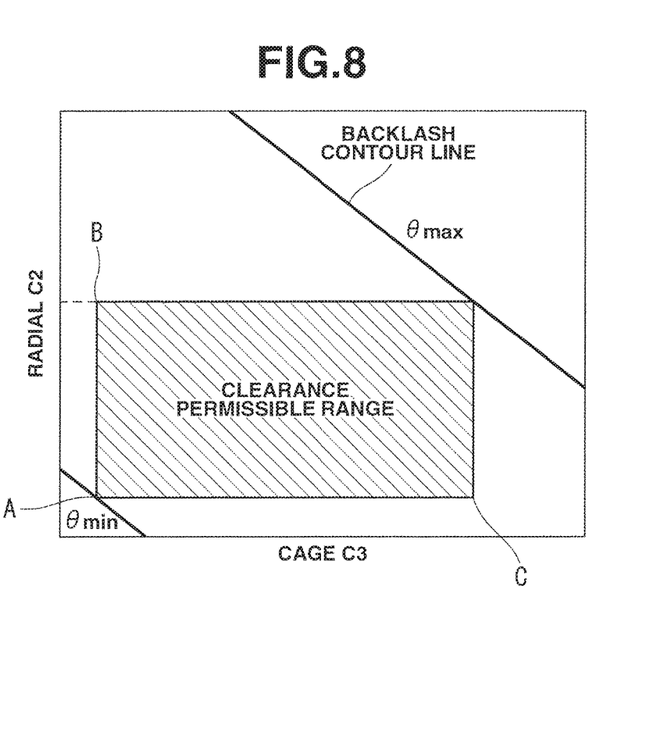
FIG. 8 is a characteristic view showing a relationship between a radial clearance and a cage clearance with respect to a backlash contour line.

That is, as shown in FIG. 8, for setting it within the range of the contour line between the minimum angle θmin and the maximum angle θmax of the backlash b, the radial clearance C2 is set between 0.003 mm of A point at which the angle is minimum angle θmin, and 0.06 mm of B point at which the angle is maximum angle θmax. On the other hand, the cage clearance C3 is set between 0.003 mm of A point at which the angle is the minimum angle θmin, and 0.110 mm of C point at which the angle is maximum angle θmax.

A lubricant supply section is arranged to supply the lubricant to the inside of the speed reduction mechanism 8. This lubricant supply section includes an oil supply passage which is formed within the bearing 02 of the cylinder head 01, and to which the lubricant is supplied from a main oil gallery (not shown); an oil supply hole 51 which is formed in the cam shaft 2 in the axial direction, and which is connected to the oil supply passage through a groove; an oil hole 52 which has a small diameter, which is formed inside the driven member 9 to penetrate in the axial direction, and which includes a first end opened to the oil supply hole 51, and a second end opened to a portion near the needle bearing 38 and the middle diameter ball bearing 47; and an oil discharge hole (not shown) which is similarly formed in the driven member 9 to penetrate through the driven member 9.

This lubrication oil supply section is arranged to supply the lubrication oil into the receiving space 44, so that the lubrication oil is stored in the receiving space 44. The lubrication oil from the receiving space 44 lubricates the middle diameter ball bearing 47 and the rollers 48. Moreover, the lubrication oil flows into the inside of the motor output shaft 13, so as to lubricate the movable section such as the needle bearing 38 and the small diameter ball bearing 37. Besides, the small diameter oil seal 44 suppresses the leakage of the lubricating oil retained within the receiving space 44 into the motor housing 5.

Operations of this Embodiment

Hereinafter, operations of this embodiment are illustrated. Firstly, the timing sprocket 1 is rotated through the timing chain in accordance with the rotation of the crank shaft of the engine. This rotational force is transmitted through the internal teeth constituting section 19 and the internal screw constituting section 6 to the motor housing 5. With this, the motor housing 5 is synchronously rotated. On the other hand, the rotational force of the internal teeth constituting section 19 is transmitted from the rollers 48 through the holding device 41 and the driven member 9 to the cam shaft 2. With this, the cams of the cam shaft 2 open and close the intake valves.

Then, in a predetermined driving state of the engine after the start of the engine, the current is applied to the coil 18 of the electric motor 12 from the control unit through the terminal strips 31 and 31, the pigtail harnesses, the power feeding brushes 30a and 30b, the slip rings 26a and 26b, and so on. With this, the motor output shaft 13 is rotated in the positive direction and in the negative direction. The speed of this rotational force is reduced by the speed reduction mechanism 8. This speed-reduced rotational force is transmitted to the cam shaft 2.

That is, when the eccentric shaft portion 39 is rotated to be eccentric in accordance with the rotation of the motor output shaft 13, each of the rollers 48 is got over one of the internal teeth 19a of the internal teeth constituting section 19 while being guided by the corresponding one of the roller holding holes 41b of the holding device 41 in the radial direction, at each one rotation of the motor output shaft 13. The each of the rollers 48 is rolled and moved to adjacent one of the internal teeth 19a. This movement of the each of the rollers 48 is repeated, so as to be rolled in the circumferential direction in the abutted state. The speed of the rotation of the motor output shaft 13 is reduced by this rolling movement of these rollers 48 in the abutted state. This speed-reduced rotational force is transmitted to the driven member 9. In this case, this speed reduction ratio can be arbitrarily set by a number of a difference between a number of the internal teeth 19a and a number of the rollers 48.

With this, the cam shaft 2 is relatively rotated in the positive direction or in the reverse direction relative to the timing sprocket 1, so as to convert the relative rotational phase. The opening or closing timing of the intake valve is controlled to be converted to the advance angle side or the retard angle side.

Each of the side surfaces of the stopper raised portion 61b is arranged to be abutted on one of the corresponding confronting surfaces 2c and 2d of the stopper recessed groove 2b, so as to restrict a maximum position of the positive and negative relative rotations of the cam shaft 2 with respect to the timing sprocket 1.

Accordingly, the opening or closing timing of the intake valve is converted to the maximum degree on the advance angle side or the retard angle side. Consequently, it is possible to improve the fuel economy (consumption) of the engine and the output of the engine.

In this embodiment, the circumferential movement permissible range is set to the angle range from 0.01° of the minimum θmin to 0.4° of the maximum θmax, which is determined by the relative clearance between the radial clearance C2 and the cage clearance site C3. Accordingly, it is possible to effectively suppress the generation of the striking noise (the hitting noise) between the roller 48 and the inside of the roller holding hole 41b, and to suppress the decrease of the operation response. That is, in this embodiment, it is possible to suppress the decrease of the operation response of the device, and at the same time to suppress the noise level.

The cage clearance C3 is adjusted by adjusting the radial clearance by selecting the different outside diameter of the outer wheel 47b, without adjusting the width of the confronting both side surfaces of the roller holding hole 41b which needs the high machining difficulty. With this, it is possible to set the play angle of the backlash B to the angle range from 0.01° to 0.4°. Accordingly, it is possible to ease the manufacturing and the working operation. Consequently, it is possible to set the manufacturing tolerance larger than the tolerance in the radial direction. Moreover, it is possible to ease the working (manufacturing). That is, it is possible to adjust the backlash B by which the roller 48 can be moved in the circumferential direction, by adjusting the radial clearance by selecting the different outside diameter of the outer wheel 47b since the plurality of the waveform internal teeth 19a are formed on the internal teeth constituting section 19.

Moreover, in this embodiment, the ball bearing 47 having the different outside diameters of the outer wheel 47a are merely replaced (changed). Accordingly, the replacing operation is easier than a case where the internal teeth constituting section 19 (the timing sprocket 1) is replaced.

Furthermore, all of the rollers 48 have the uniform outside diameter to be single gradation grade. Accordingly, the manufacturing is easy.

Moreover, the space portion 32 is in the sealed state by the large diameter oil seal 50 and the annular seal member 33. However, the air drain plug member 56 is provided to the cylindrical portion 34 of the cover member 3. Even when the temperature within the space portion 32 is increased by the sliding movement of the power feeding brushes 30a and 30b to the slip rings 26a and 26b during the operation of the device, it is possible to rapidly discharge the air within the space portion 32 through the filter 59. With this, it is possible to effectively suppress the increase of the internal pressure of the space portion 32.

Therefore, it is possible to sufficiently suppress the deformation and the dropping (the falling) of the components such as the large diameter oil seal 50 and the annular seal member 33.

The present invention is not limited to the structures of the embodiments. For example, the device can be provided to the exhaust side, in addition to the intake side of the valve timing control device.

Moreover, the roller holding hole may have an opened tip end portion having a U-shape, in addition to the portion which is cut out into the rectangular shape in this embodiment.

In this embodiment, the electric motor 12 is integrated with the timing sprocket 1. However, the electric motor 12 may be a member different from the timing sprocket 1.

The artificial thoughts which are grasped from the embodiments, and which are other than the claims are explained below.

[claim a]

The valve timing control device described in claim 1, wherein the clearance is adjusted by selectively assembling one or both of the eccentric rotation member and the internal teeth in accordance with the outside diameters of the rolling members.

[claim b]

The valve timing control device described in claim a, wherein the eccentric rotation member is constituted by the eccentric shaft portion whose the rotation center is eccentric from the rotation axis of the motor output shaft, and a ball bearing having an inner wheel fixed on the an outer circumference surface of the eccentric shaft portion; and selective assembly of the eccentric rotation member is performed by selectively assembling the plurality of the ball bearings having the outer wheels having the different outside diameters.

[claim c]

The valve timing control device described in claim a, wherein the each rolling members has a uniform outside diameter.

[claim d]

The valve timing control device described in claim 1, wherein each of the rolling members is a roller having a cylindrical solid shape.

The invention claimed is:
1. A valve timing control device for an internal combustion engine comprising:
   a driving rotation member to which a rotational force is transmitted from a crank shaft;
   a driven rotation member fixed to a cam shaft;
   the valve timing control device being vary a relative rotation position of the driven rotation member with respect to the driving rotation member, and thereby to vary operation characteristics of an engine valve,
   an electric motor whose a rotation state is controlled by a control signal; and
   a speed reduction mechanism configured to reduce a speed of a rotation of an output shaft of the electric motor, and to vary a relative rotation phase between the driving rotation member and the driven rotation member,
   the speed reduction mechanism including;
      an eccentric rotation member provided to the motor output shaft of the electric motor, an internal teeth constituting section which is provided to the driving rotation member, and which has a plurality of internal teeth provided on an inner circumference, a plurality of rolling members which are provided on an outer circumference of the eccentric rotation member, and engaging portions between the rolling members and the internal teeth being moved in the circumferential direction by the eccentric rotation of the eccentric rotation member, and a holding member which is provided to the driven rotation member, and which has holding holes that are configured to restrict a circumferential movement of each of the rolling members, and to allow a radial movement of the each of the rolling members, a circumferential clearance of the each of the rolling member being formed within an angle range of 0.01° to 0.4° in a circumferential direction from a reference line extending from a rotation axis of the driving rotation member in a radial direction, in a space constituted by the eccentric rotation member, the internal teeth constituting section, and the one of the holding holes.

2. The valve timing control device for the internal combustion engine as claimed in claim 1, wherein a cage clearance between an inner side surface of the holding hole on one side and an outer circumference surface of the rolling member is set to 0.003 to 0.110 mm.

3. The valve timing control device for the internal combustion engine as claimed in claim 2, wherein a radial clearance between the outer circumference surface of the rolling member and the outer circumference of the eccentric rotation member is set to 0.003 to 0.06 mm.

4. The valve timing control device for the internal combustion engine as claimed in claim 2 wherein a radial clearance between the outer circumference surface of the rolling member and an inner surface of the internal teeth is set to 0.003 to 0.06 mm.

5. A valve timing control device for an internal combustion engine comprising:

a driving rotation member to which a rotational force is transmitted from a crank shaft;

a driven rotation member fixed to a cam shaft;

an electric motor provided to the driving rotation member;

an eccentric rotation member which is provided to a motor output shaft, and which is eccentrically rotated with respect to a rotation center;

an internal teeth constituting section provided to the driving rotation member, and which includes a plurality of internal teeth that are formed on an inner circumference;

a plurality of rolling members which are provided on an outer circumference side of the eccentric rotation member at a substantially regular interval in a circumferential direction, and engaging portions between the rolling members and the internal teeth being moved in the circumferential direction by the eccentric rotation of the eccentric rotation member, and a holding member which is provided to the driven rotation member, and which has holding holes that are configured to restrict a circumferential movement of each of the rolling members, and to allow a radial movement of the each of the rolling members, a movable range of the each of the rolling member being set within an angle range of 0.01° to 0.4° in a circumferential direction from a center line extending from a rotation axis of the driving rotation member in a radial direction, in a space which is constituted by the eccentric rotation member, the internal teeth constituting section, and the one of the holding holes, and which receives the one of the rollers.

6. The valve timing control device for the internal combustion engine as claimed in claim 5, wherein the movable range of the rolling member in the circumferential direction within the holding hole is set to 0.003 to 0.110 mm.

7. The valve timing control device for the internal combustion engine as claimed in claim 6, wherein the movable range of the roller in the radial direction between the outer circumference of the eccentric rotation member and an inner circumference of the internal teeth of the internal teeth constituting section is set to 0.003 to 0.06 mm.

8. The valve timing control device for the internal combustion engine as claimed in claim 5, wherein the eccentric rotation member includes an eccentric shaft portion whose a rotation center is eccentric from the rotation axis of the motor output shaft, and a ball bearing including an inner wheel supported on the outer circumference of the eccentric shaft portion; and the eccentric shaft portion is integrally provided to the motor output shaft of the electric motor from the axial direction.

9. The valve timing control device for the internal combustion engine as claimed in claim 5, wherein the electric motor includes a permanent magnet provided on a housing, the motor output shaft which is rotatably supported within the housing, and which includes a rotor provided on an outer circumference, and a coil provided to the rotor.

10. The valve timing control device for the internal combustion engine as claimed in claim 9, wherein the valve timing control device includes a cover member covering a front end portion of the electric motor, and a power feeding brush provided to the cover member; the electric motor includes a slip ring provided to an axial end side of the motor output shaft; and the coil of the motor is energized by the slip ring electrically abutting on the power feeding brush.

11. The valve timing control device for the internal combustion engine as claimed in claim 5, wherein the rolling member is a roller which is a solid cylindrical shape.

12. A assembling method of a valve timing control device for an internal combustion engine which includes a driving rotation member to which a rotational force is transmitted from a crank shaft, and a driven rotation member fixed to a cam shaft to which the rotational force is transmitted from the driving rotation member, the valve timing control device being vary a relative rotation position of the driven a rotation member with respect to the driving rotation member, and thereby to vary operation characteristics of an engine valve, the assembling method comprising:

providing an electric motor, a speed reduction mechanism configured to reduce a speed of a rotation of an output shaft of the electric motor, and to vary a relative rotation phase between the driving rotation member and the driven rotation member, the speed reduction mechanism including an eccentric rotation member provided to the motor output shaft of the electric motor, an internal teeth constituting section which is provided to the driving rotation member, and which has a plurality of internal teeth provided on an inner circumference, a plurality of rolling members which are provided on an outer circumference side of the eccentric rotation member in a circumferential direction, and engaging portions between the rolling members and the internal teeth being moved in the circumferential direction by the eccentric rotation of the eccentric rotation member, and a holding member which is provided to the driven rotation member, and which has holding holes that are configured to restrict a circumferential movement of each of the rolling members, and to allow a radial movement of the each of the rolling members, selectively assembling one or both of the eccentric rotation member and the internal teeth constituting section in accordance with an outside diameter of the rolling member so that a clearance in which the each of the rolling member is movable in the circumferential direction is within an angle range of 0.01° to 0.4° in a circumferential direction from a reference line extending from a rotation axis of the driving rotation member in a radial direction.

13. The valve timing control device for the internal combustion engine as claimed in claim 12, wherein the eccentric rotation member includes an eccentric shaft portion whose a rotation center is eccentric from the rotation axis of the motor output shaft, and a ball bearing including an inner wheel supported on the outer circumference of the eccentric shaft portion; and the selective assembly of the eccentric rotation member is performed by selectively assembling the plurality of the ball bearings having the outer wheels having the different outside diameters.

* * * * *